(12) United States Patent
Cyr et al.

(10) Patent No.: US 10,676,184 B2
(45) Date of Patent: Jun. 9, 2020

(54) PITCH CONTROL SYSTEM FOR AN AIRCRAFT

(71) Applicant: SIKORSKY AIRCRAFT CORPORATION, Stratford, CT (US)

(72) Inventors: Mark M. Cyr, Meriden, CT (US); Karl Gradzki, Cromwell, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 224 days.

(21) Appl. No.: 15/502,416

(22) PCT Filed: Aug. 27, 2015

(86) PCT No.: PCT/US2015/047150
§ 371 (c)(1),
(2) Date: Feb. 7, 2017

(87) PCT Pub. No.: WO2016/043942
PCT Pub. Date: Mar. 24, 2016

(65) Prior Publication Data
US 2017/0225776 A1  Aug. 10, 2017

Related U.S. Application Data

(60) Provisional application No. 62/043,156, filed on Aug. 28, 2014.

(51) Int. Cl.
*B64C 13/12* (2006.01)
*B64C 27/56* (2006.01)
(Continued)

(52) U.S. Cl.
CPC .............. *B64C 27/56* (2013.01); *B64C 11/30* (2013.01); *B64C 11/301* (2013.01); *B64C 13/12* (2013.01);
(Continued)

(58) Field of Classification Search
CPC .......... B64C 11/00; B64C 11/06; B64C 11/30; B64C 11/301; B64C 13/12; B64C 27/22; B64C 27/56; B64C 27/82
See application file for complete search history.

(56) References Cited

U.S. PATENT DOCUMENTS 2,242,314 A   5/1941  Martin et al.
2,455,378 A  12/1948  McCoy
(Continued)

FOREIGN PATENT DOCUMENTS

DE   3543326 A1 *  6/1987  ........... B63H 21/213
DE   3543326 A1     6/1987
GB    517117 A      1/1940

OTHER PUBLICATIONS

Extended European Search Report; European Application No. 15842277.4; dated Mar. 28, 2018; 9 Pages.
(Continued)

*Primary Examiner* — Richard R. Green
*Assistant Examiner* — Michael A. Fabula
(74) *Attorney, Agent, or Firm* — Cantor Colburn LLP (57) ABSTRACT

A pitch control system configured to vary a pitch angle of a plurality of propeller blades of a propeller system is provided including a motor having a motor shaft configured to rotate about an axis. A rotary switch having a tab protruding generally outwardly is coupled to the motor shaft and is configured to move between a first position and a second position. The pitch control system also includes a position sensor configured to monitor the position of the rotary switch. The position of the rotary switch is proportional to the pitch angle of the plurality of propeller blades.

18 Claims, 8 Drawing Sheets

(51) Int. Cl.
*B64C 27/82* (2006.01)
*B64C 11/30* (2006.01)
*B64C 27/57* (2006.01)

(52) U.S. Cl.
CPC .............. *B64C 27/57* (2013.01); *B64C 27/82* (2013.01); *B64C 2027/8236* (2013.01)

(56) References Cited

U.S. PATENT DOCUMENTS

| | | | |
|---|---|---|---|
| 2,740,255 | A | 4/1956 | Machlanski |
| 2,740,483 | A | 4/1956 | Machlanski |
| 3,332,643 | A | 7/1967 | Toner |
| 3,490,296 | A | 1/1970 | Yates et al. |
| 3,599,652 | A | 8/1971 | Perkins et al. |
| 3,699,771 | A | 10/1972 | Chelminski |
| 3,866,857 | A | 2/1975 | Ciastula |
| 4,028,004 | A | 6/1977 | Wind |
| 4,195,802 | A | 4/1980 | Gilson et al. |
| 4,534,524 | A | 8/1985 | Aldrich |
| 4,535,524 | A | 8/1985 | Aldrich |
| 4,667,909 | A | 5/1987 | Curci |
| 4,789,305 | A | 12/1988 | Vaughen |
| 5,076,517 | A | 12/1991 | Ferranti et al. |
| 5,127,608 | A | 7/1992 | Farineau et al. |
| 5,149,023 | A * | 9/1992 | Sakurai ................. B64C 13/12 244/229 |
| 5,213,282 | A | 5/1993 | Gold et al. |
| 5,291,113 | A * | 3/1994 | Hegg ................. B64C 13/12 244/135 A |
| 5,428,543 | A | 6/1995 | Gold et al. |
| 5,472,156 | A * | 12/1995 | Bivens, III ............. B64C 13/04 244/229 |
| 5,738,494 | A | 4/1998 | Schmaling |
| 5,900,710 | A * | 5/1999 | Gautier ................. B64C 13/503 244/223 |
| 5,997,250 | A | 12/1999 | Carter, Jr. et al. |
| 6,086,016 | A | 7/2000 | Meek |
| 6,334,592 | B1 | 1/2002 | Tomio et al. |
| 6,512,344 | B1 | 1/2003 | Konno et al. |
| 6,572,055 | B1 * | 6/2003 | Bernard ................. B64C 13/12 244/229 |
| 7,438,259 | B1 * | 10/2008 | Piasecki ................. B64C 27/26 244/6 |
| 7,648,106 | B2 * | 1/2010 | Granier ................. B64C 13/04 244/223 |
| 8,074,940 | B2 | 12/2011 | Kopp |
| 8,196,857 | B2 * | 6/2012 | Gemmati ................. B64C 13/28 244/17.25 |
| 8,465,257 | B1 | 6/2013 | Noble et al. |
| 8,991,744 | B1 | 3/2015 | Khan |
| 9,085,372 | B2 | 7/2015 | Saucray et al. |
| 2003/0226937 | A1 | 12/2003 | Einthoven et al. |
| 2006/0269413 | A1 | 11/2006 | Cotton et al. |
| 2008/0237392 | A1 * | 10/2008 | Piasecki ................. B64C 27/26 244/6 |
| 2009/0266940 | A1 | 10/2009 | Miller et al. |
| 2009/0314901 | A1 * | 12/2009 | Granier ................. B64C 13/04 244/76 R |
| 2010/0308178 | A1 | 12/2010 | Gemmati et al. |
| 2011/0024551 | A1 | 2/2011 | Biest et al. |
| 2011/0108673 | A1 * | 5/2011 | Antraygue ............. B64C 13/12 244/228 |
| 2012/0072056 | A1 | 3/2012 | Hasan et al. |
| 2012/0097800 | A1 * | 4/2012 | Burroughs ............. B64C 13/12 244/197 |
| 2012/0255386 | A1 * | 10/2012 | Couderc ................. B64C 13/30 74/471 XY |
| 2013/0206898 | A1 * | 8/2013 | Yates ..................... B64C 13/04 244/17.11 |
| 2013/0206900 | A1 * | 8/2013 | Yates ..................... B64C 27/56 244/17.25 |
| 2013/0209256 | A1 * | 8/2013 | Yates ..................... F01D 7/00 416/112 |
| 2013/0211631 | A1 * | 8/2013 | Yates ..................... B64C 13/04 701/3 |
| 2014/0077025 | A1 * | 3/2014 | Yates ..................... B64C 13/04 244/17.13 |
| 2014/0263850 | A1 | 9/2014 | Kerdreux et al. |
| 2015/0001336 | A1 | 1/2015 | Eglin |
| 2015/0191241 | A1 * | 7/2015 | Antraygue ............. B64C 13/04 701/3 |
| 2015/0329199 | A1 * | 11/2015 | Golborne ................. B64C 27/04 244/196 |
| 2015/0367937 | A1 * | 12/2015 | Greenfield ........... G05D 1/0858 701/4 |
| 2016/0083103 | A1 | 3/2016 | Munier et al. |
| 2017/0233066 | A1 * | 8/2017 | Bredenbeck, Jr. ...... B64C 11/30 244/230 |

OTHER PUBLICATIONS

Extended European Search Report; European Application No. 15842927.4; dated Mar. 27, 2018; 7 Pages.

U.S. Final Office Action received for U330340US2; U.S. Appl. No. 15/502,684; dated Nov. 15, 2019; 11 pages.

* cited by examiner

PITCH CONTROL SYSTEM FOR AN AIRCRAFT

CROSS REFERENCE TO RELATED APPLICATIONS

This application is a National Stage application of PCT/US2015/047150, filed Aug. 27, 2015, which claims the benefit of U.S. Provisional Application No. 62/043,156, filed Aug. 28, 2014, both of which are incorporated by reference in their entirety herein.

BACKGROUND OF THE INVENTION

Embodiments of the invention generally relate to a propeller system of a rotary wing aircraft, and more particularly, to a system for controlling the pitch of a variable pitch propeller system of a high-speed rotary wing aircraft.

A rotary wing aircraft with a coaxial contra-rotating rotor system is capable of higher speeds compared to conventional singe rotor helicopters due in part to the balance of lift between the advancing sides of the main rotor blades on the upper and lower rotor systems. To still further increase airspeed, supplemental translational thrust is provided by a translational thrust system, such as a propeller system oriented substantially horizontal and parallel to the aircraft longitudinal axis to provide thrust for high speed flight.

The thrust generated by the translational thrust system is affected by varying the pitch of the propeller blades individually as the rotor rotates and by varying the pitch of all of the blades together. The translational thrust systems of conventional rotary wing aircrafts include a two way switch configured to control the pitch of the propeller blades. An operator of the aircraft applies a force to one side of the switch to incrementally increase the pitch in a positive direction and applies a force to a second side of the switch to incrementally increase the pitch in a negative direction. Because the switch is continually biased back to the center, the operator must track how many times each side of the button was pressed to have an idea of the pitch angle of the propeller blades.

Therefore, a need exists for an improved control for adjusting the pitch angle of a propeller system which can more efficiently indicate to an operator of the rotary wing aircraft the current pitch angle.

BRIEF DESCRIPTION OF THE INVENTION

According to one embodiment of the invention, a pitch control system configured to vary a pitch angle of a plurality of propeller blades of a propeller system is provided including a motor having a motor shaft configured to rotate about an axis. A rotary switch having a tab protruding generally outwardly is coupled to the motor shaft and is configured to move between a first position and a second position. The pitch control system also includes a position sensor configured to monitor the position of the rotary switch. The position of the rotary switch is proportional to the pitch angle of the plurality of propeller blades.

According to another embodiment of the invention, a rotary wing aircraft including a propeller system having a plurality of propeller blades is provided including a first pilot interface having a first pitch control system and a second pilot interface having a second pitch control system. The first pitch control system and the second pitch control system are configured to adjust a pitch angle of the plurality of propeller blades of the propeller system. The first pitch control system includes a first motor having a first motor shaft configured to rotate about a first axis and a first rotary switch having a first tab protruding generally outwardly. The first rotary switch is coupled to the first motor shaft and is configured to move between a first position and a second position. The first pitch control system also includes a first position sensor configured to monitor the position of the first rotary switch. The second pitch control system includes a second motor having a second motor shaft configured to rotate about a second axis and a second rotary switch having a second tab protruding generally outwardly. The second rotary switch is coupled to the second motor shaft and is configured to move between a first position and a second position. The second pitch control system also includes a second position sensor configured to monitor the position of the second rotary switch. The position of the first rotary switch and the second rotary switch is proportional to the pitch angle of the plurality of propeller blades. The aircraft also includes a flight control system including a flight control computer operably coupled to the first pitch control system and the second pitch control system. The second rotary switch is configured to rotate in response to rotation of the first rotary switch such that the first rotary switch and the second rotary switch are in generally identical positions.

According to yet another embodiment of the invention, a method of adjusting a pitch angle of a plurality of propeller blades of a propeller system is provided including rotating a rotary switch of a pitch control system to a first position. The first position of the rotary switch is transmitted to a flight control computer. A signal indicative of an amount and direction of rotation for at least one of the plurality of propeller blades to achieve the pitch angle corresponding to the first position of the rotary switch is generated. And at least one of the plurality of propeller blades is rotated to the pitch angle.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1A:
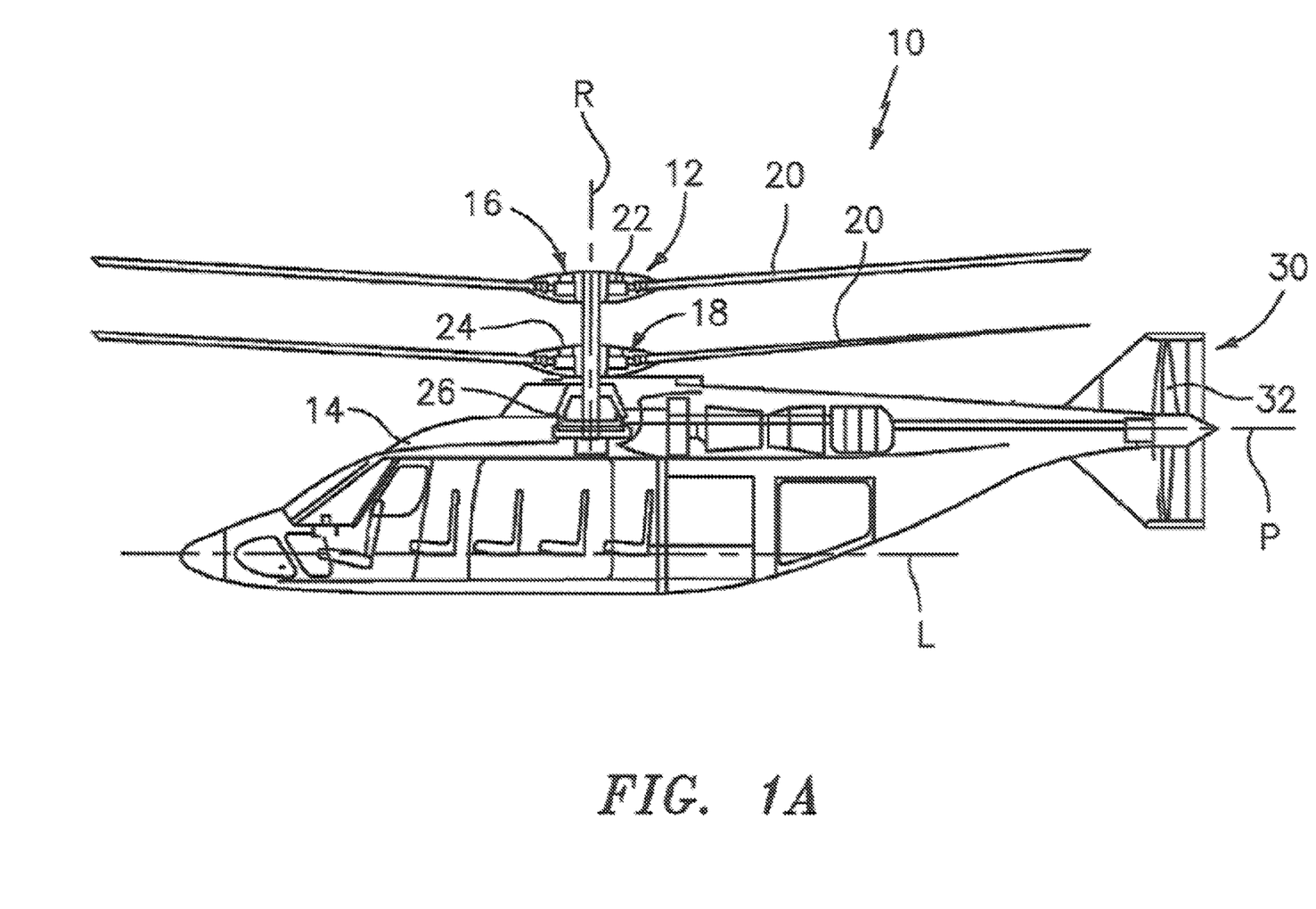
FIGS. 1A and 1B are general side views of an exemplary rotary wing aircraft for use with the present invention.
Figure 1B:
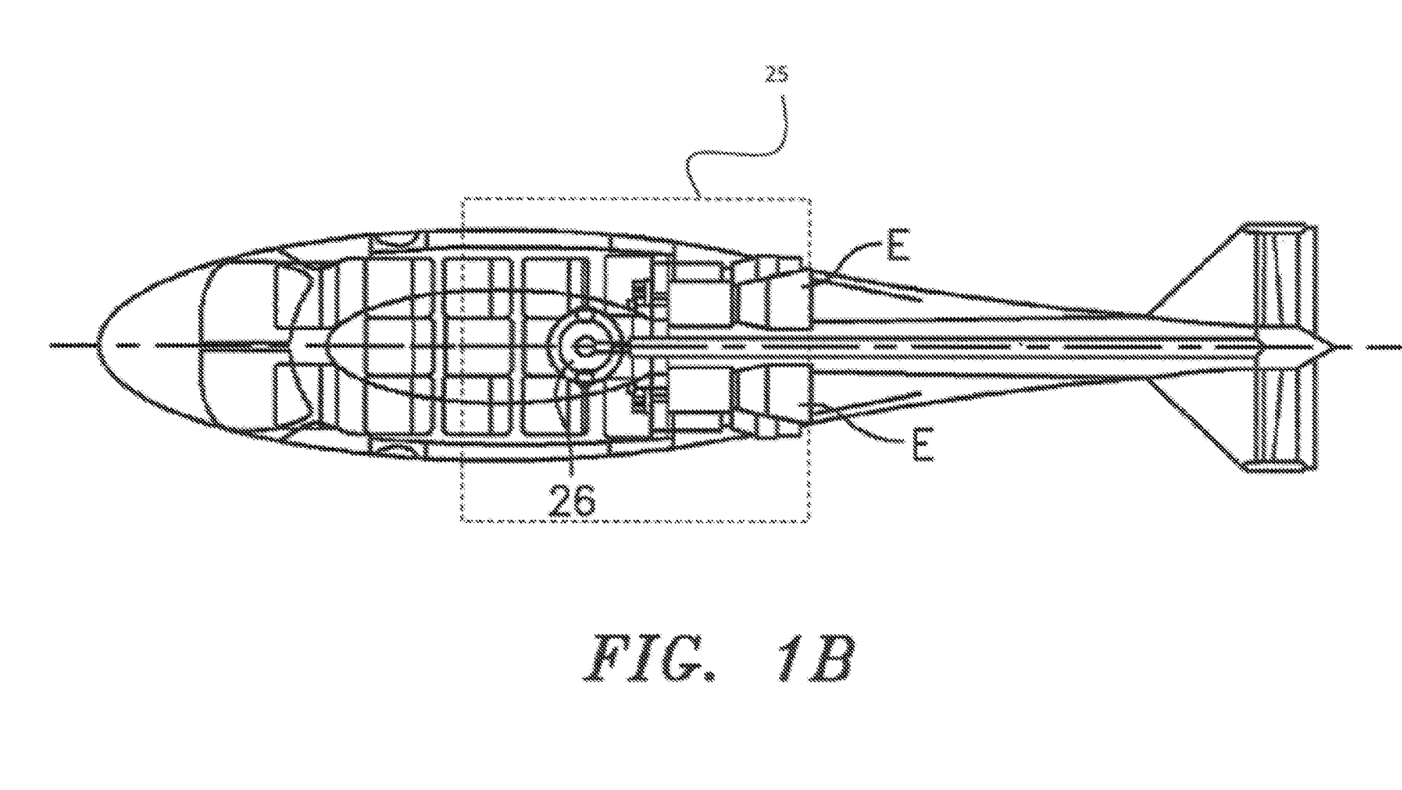

FIGS. 1A and 1B illustrate an exemplary vertical takeoff and landing (VTOL) high speed compound or coaxial contra-rotating rigid rotor aircraft 10 having a dual, contra-rotating main rotor system 12, which rotates about a rotor axis of rotation R. The aircraft includes an airframe 14 which supports the dual, contra-rotating, coaxial main rotor system 12 as well as a translational thrust system 30 which provides translational thrust generally parallel to an aircraft longitudinal axis L.

The main rotor system 12 includes an upper rotor system 16 and a lower rotor system 18. A plurality of rotor blades assemblies are 20 mounted to a rotor hub 22, 24 of each rotor system 16, 18, respectively. The main rotor system 12 is driven by a transmission 25. The translational thrust system 30 may be any propeller system including, but not limited to a pusher propeller, a tractor propeller, a nacelle mounted propeller etc. The illustrated translational thrust system 30 includes a pusher propeller system 32 with a propeller rotational axis P oriented substantially horizontal and parallel to the aircraft longitudinal axis L to provide thrust for high speed flight. The translational thrust system 30 may be driven through the main gearbox 26 which also drives the rotor system 12.

The transmission 25 includes a main gearbox 26 driven by one or more engines, illustrated schematically at E. The main gearbox 26 and engines E are considered as part of the non-rotating frame of the aircraft 10. In the case of a rotary wing aircraft, the gearbox 26 may be interposed between one or more gas turbine engines E, the main rotor system 12 and the translational thrust system 30. In one embodiment, the main gearbox 26 is a split torque gearbox which carries torque from the engines E through a multitude of drivetrain paths. Although a particular rotary wing aircraft configuration is illustrated and described in the disclosed non-limiting embodiment, other configurations and/or machines with rotor systems are within the scope of the present invention.

Figure 2:
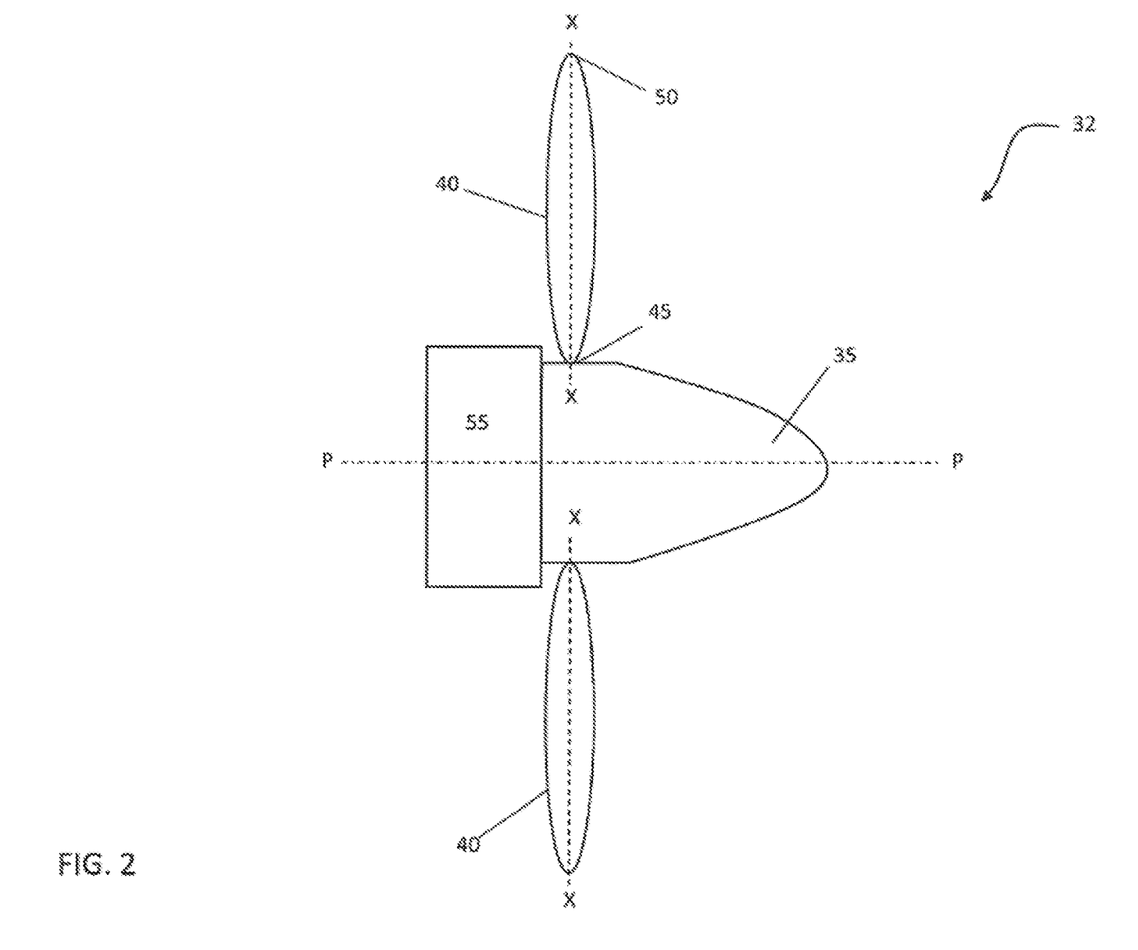
FIG. 2 is a cross-section of an propeller system of a translational thrust system of a rotary wing aircraft.

Referring now to FIG. 2, the propeller system 32 of the translational thrust system 30 includes a hub assembly 35 configured to support a plurality of blades 40 extending outwardly therefrom. The root end 45 of each blade 40 is mounted to the hub assembly 35 such that an axis X of each blade 40, extending from the root end 45 to the tip 50, is arranged within a plane (not shown). The axis of rotation P of the hub assembly 35 is substantially perpendicular to the plane defined by the blades 40. The propeller 32 is a variable pitch propeller such that the blades 40 are configured to rotate about their respective X axes individually or collectively relative to the hub assembly 35. In one embodiment, the translational thrust system 30 includes at least one mechanical-hydraulic actuator 55 configured to operate in response to a propeller pitch controller 60 (illustrated schematically in FIG. 3) to adjust the pitch of the propeller system 32.

Figure 4:
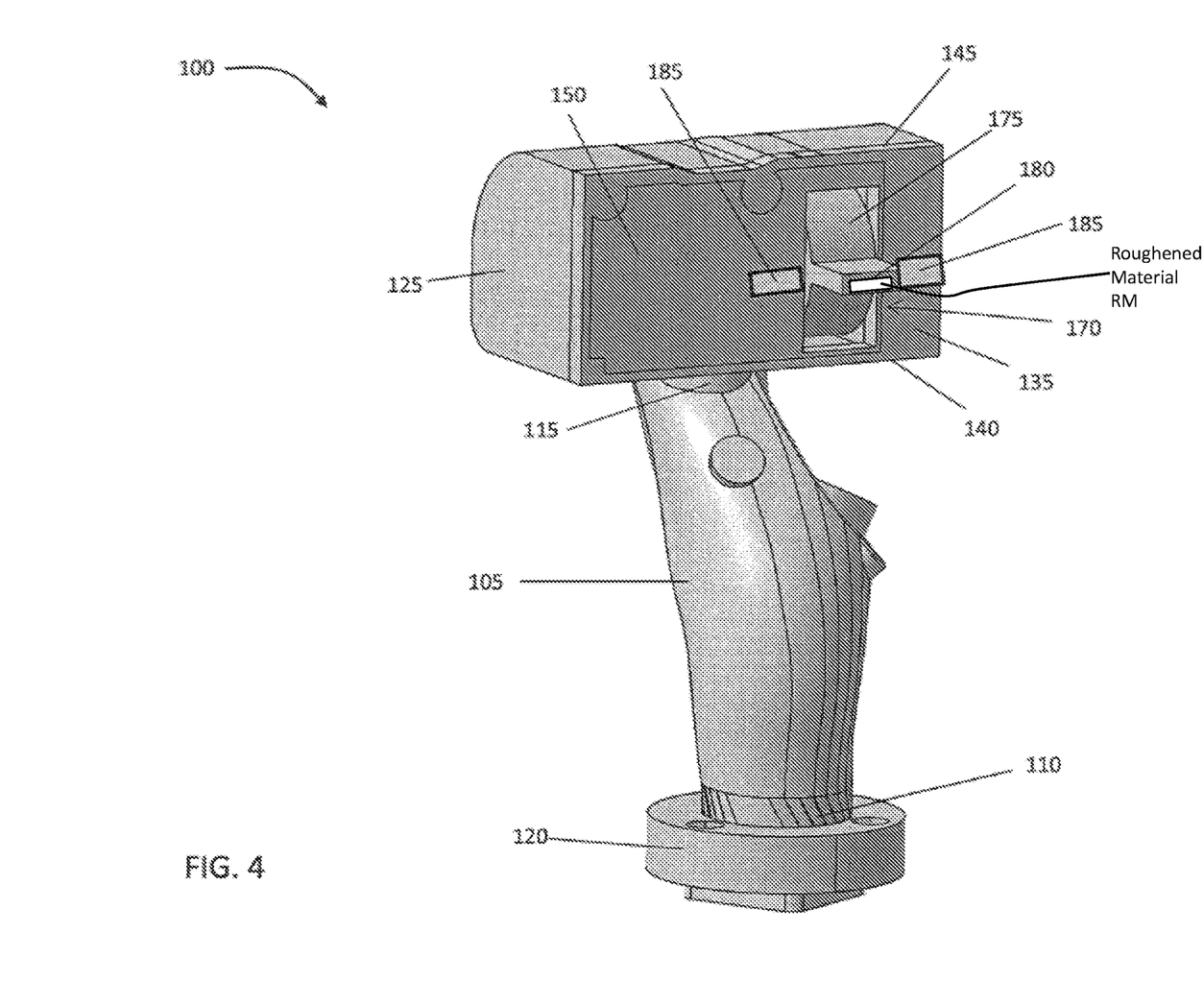
FIG. 4 is a perspective view of pilot interface including a pitch control system according to an embodiment of the invention.

Portions of the VTOL rotary wing aircraft 10, such as the translational thrust system 30 for example, are driven by a flight control system 70, illustrated in FIG. 4. In one embodiment, the flight control system 70 is a fly-by-wire control system (FBW). In a FBW flight control system, there is no direct mechanical coupling between a pilot's controls and a movable component, for example propeller blades 40 of the rotary wing aircraft 10. Instead of using cables, a FBW control system includes a plurality of sensors (not shown) which sense the position of the controls and generate electrical signals proportional to the sensed position. The electrical signals, as well as additional aircraft data is provided to a flight control computer 75. In response to the inputs, the flight control computer 75 transmits a signal to a controller of an actuator, such as the propeller pitch controller 60 configured to activate the mechanical-hydraulic actuator 55 to rotate each of the propeller blades 40 of the propeller system 32 about a respective axis X. In an FBW system, an operator provides input to the flight control system 70 through an operator interface 100, such as a cyclic or collective control for example.

Figure 3:
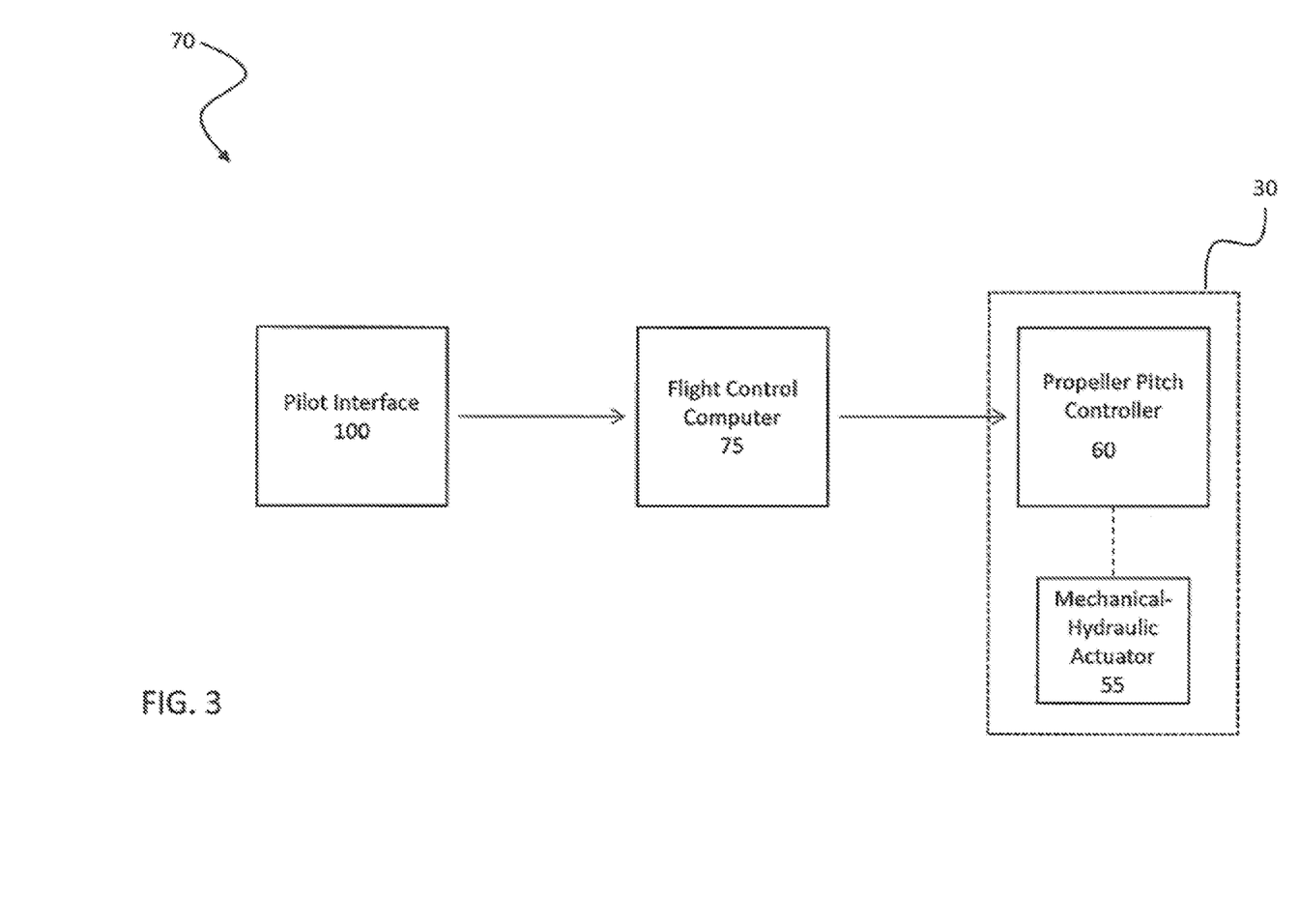
FIG. 3 is a schematic diagram of a flight control system of a rotary wing aircraft according to an embodiment of the invention.
Figure 5:
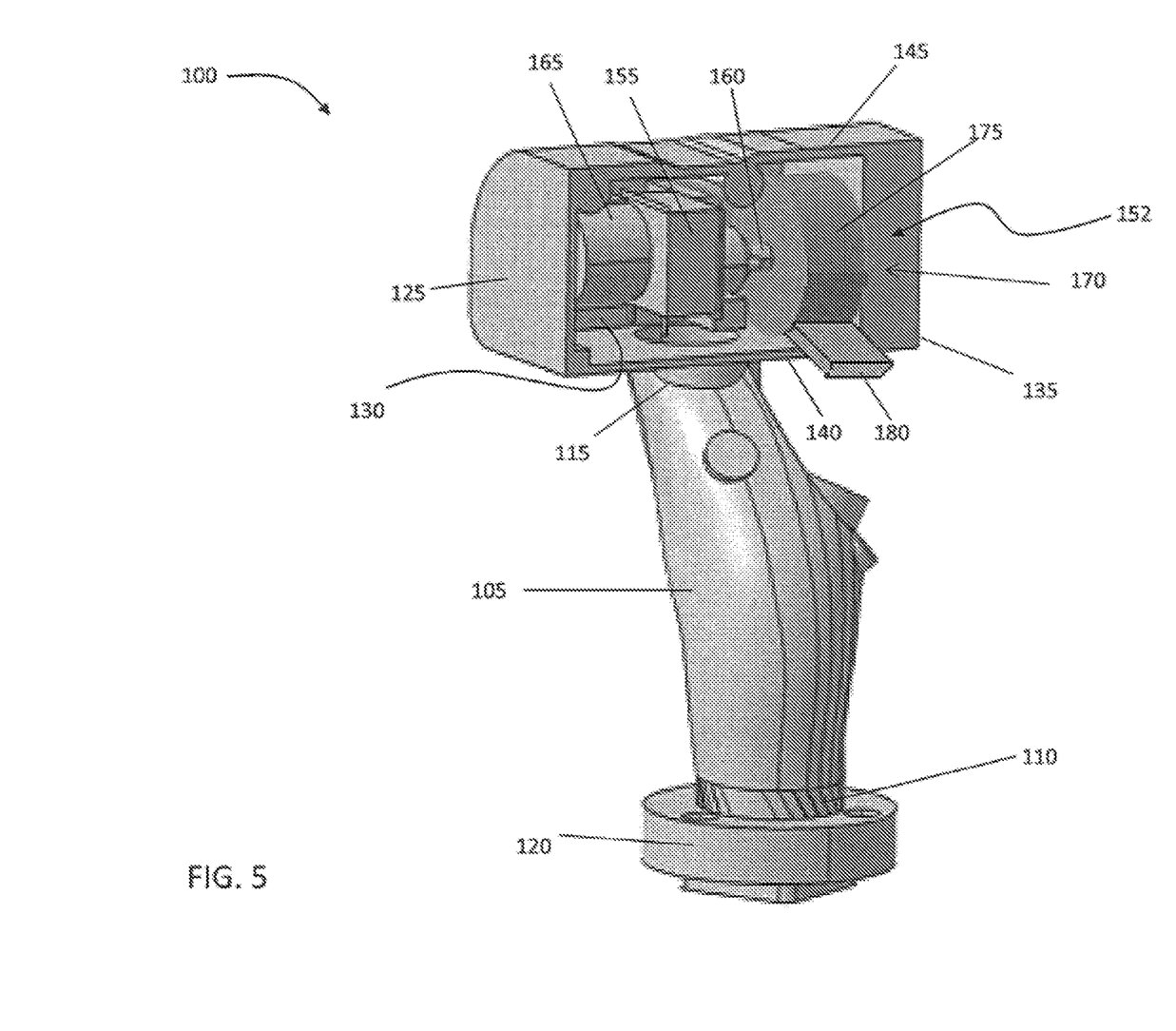
FIG. 5 is a perspective view of pilot interface including a pitch control system in a full aft thrust pitch position according to an embodiment of the invention.
Figure 6:
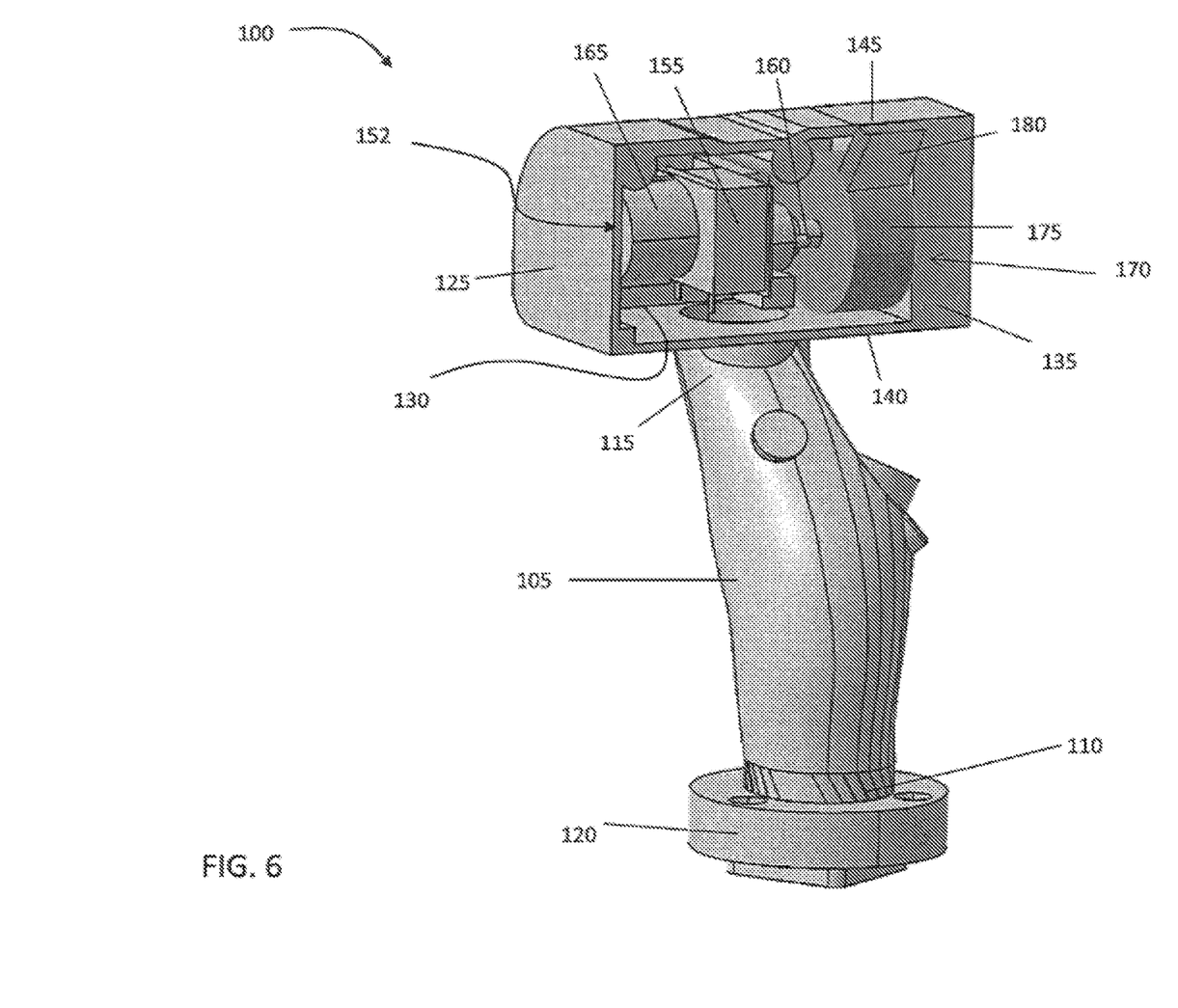
FIG. 6 is a perspective view of pilot interface including a pitch control system in a full forward thrust pitch position according to an embodiment of the invention.

Referring now to FIGS. 4-6, an operator interface 100 configured to control the pitch of the blades 40 of the propeller system 32 includes a grip body 105 having a shape generally complementary to the contour of an operator's hand. A mounting area 120 is arranged at a first end 110 of the grip body 105 and a grip head 125 is located at a second, opposite end 115 of the grip body 105. The mounting area 120 is configured to attach the grip body 105 to another component, for example within a cockpit of the rotary wing aircraft 10. The grip head 125 includes a generally hollow cavity 130. As shown in FIG. 3, a cover plate 150 may be positioned over at least a portion of the front surface 135 of the grip head 125 to prevent dust, dirt, and other debris from entering the cavity 130.

Disposed within a portion of the operator interface 100 is a pitch control system 152. In the illustrated, non-limiting embodiment, a back driven motor 155 having a motor shaft 160 configured to rotate about an axis A (see FIG. 7) is positioned within the cavity 130. A position sensor, such an encoder for example 165 is connected to the motor 155, and is configured to track the position of the motor shaft 160 as it rotates. Mechanically coupled to the motor shaft 160 is a rotary switch 170 including a tab 180 that protrudes generally outwardly from the body 175 of the switch 170, beyond the front surface 135 of the grip head 125. In one embodiment, a roughened material (RM), such as a knurled or anti-skid tape for example, is wrapped about the exterior of the tab to prevent slippage of an operator's finger from the tab 180. Although a particular configuration of the pitch control system 152 is illustrated and described in the disclosed non-limiting embodiment, other configurations, such as where a portion or all of the system 152 is mounted in the grip body 105 for example, are within the scope of the invention.

The position of the rotary switch 170 is directly proportional to the pitch angle of the plurality of propeller blades 40 of the propeller system 32. In one embodiment, each degree of rotation of the rotary switch 170 is equal to a degree of rotation of the propeller blades 40 about axis X. The rotary switch 170 is configured to rotate between a full aft thrust pitch position (FIG. 5) where the tab 180 is located adjacent a first side 140 of the grip head 125 and a full forward thrust pitch position (FIG. 6) where the tab 180 is in contact with a second, opposite side 145 of the grip head 125. The full aft thrust pitch position of the rotary switch 170 corresponds to a maximum pitch of the propeller blades 40 in a first direction of rotation about axis X, such as −10 degrees for example. Similarly, the full forward thrust pitch position of the rotary switch 170 corresponds to a maximum pitch of the propeller blades 40 in a second direction of rotation about axis X, such as 60 degrees for example. A third generally central position of the rotary switch 170, shown in FIG. 4, indicates that the pitch of propeller blades 40 is zero degrees. In one embodiment, at least one raised marker 185 extends from a front surface 135 of the grip head 125 or from the cover plate 150. The at least one raised marker 185 is generally aligned with the tab 180 when in the third position to provide a quick reference for the neutral pitch position of the rotary switch 170.

To adjust the pitch of the blades 40 of the propeller system 32 using the pitch control system 152, an operator applies a force to the tab 180, causing the rotary switch 170 and therefore the motor shaft 160 to rotate about axis A. The position sensor 165 monitors the movement and provides a continuous signal indicative of the position of the motor shaft 160 as an input I1 to a flight control computer of the flight control system 60. In response to the input signal I1, the flight control computer sends a signal to a propeller pitch controller indicating a direction and amount to rotate at least one of the plurality of blades 40 about a respective X axis. The propeller pitch controller operably coupled to the actuator system configured to mechanically rotate the blades 40.

Figure 7:
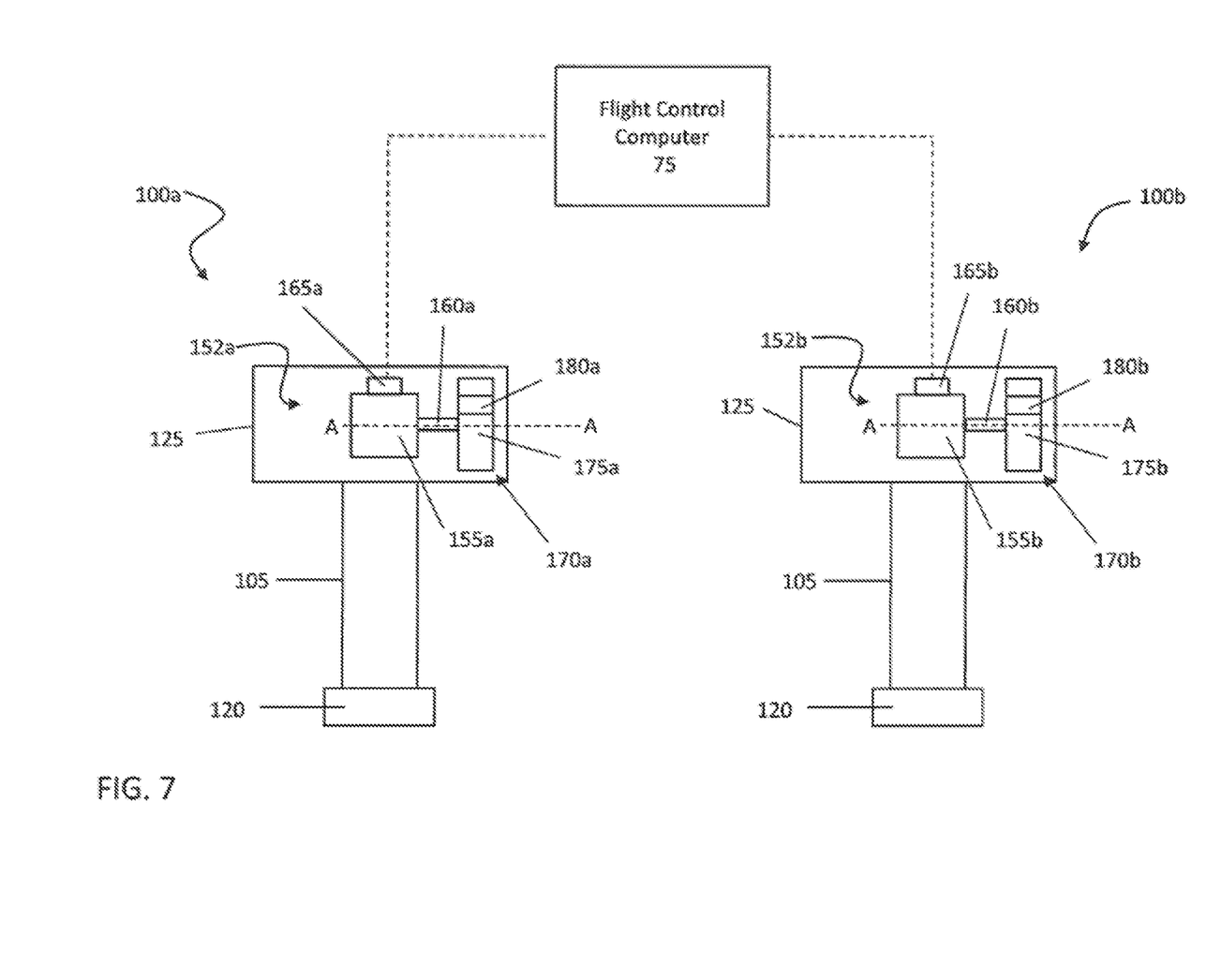
FIG. 7 is a schematic diagram of a plurality of pilot interfaces arranged within a cockpit of the rotary wing aircraft according to an embodiment of the invention.

Referring now to FIG. 7, the rotary wing aircraft 10 may include more than one substantially identical operator interface 100, such as a first operator interface 100a configured for use by a pilot and a second operator interface 100b configured for use by a co-pilot. The pitch control system 152a of the first operator interface 100 is operably coupled to the pitch control system 152b of the second operator interface 152b via the flight control computer 75 such that the rotary switches 170 of both systems 152 are in the same position.

When the rotary switch 180 of the first operator input 100a is rotated, the first position mechanism 165a provides a first signal to the flight control computer 75 indicating the current position of the first motor shaft 160a, and therefore of the first rotary switch 170a. The second position mechanism 165b simultaneously sends the flight control computer 75 a second signal indicating the current position of the second motor shaft 160b and the second rotary switch 170b. The flight control computer 75 is configured to calculate the difference in position of first rotary switch 170a and the second rotary switch 170b. The flight control computer 75 communicates a signal to the second motor 155b indicating an amount and direction of rotation such that the first rotary switch 170a and the second rotary switch 170b are in substantially identical positions relative to the pilot interface 100. Although the second pitch control system 152b is described as being rotated in response to movement of the first pitch control system 152a, rotation of the second rotary switch 170b may similarly be used to drive rotation of the first rotary switch 170a.

Use of the pilot interface 100 including the pitch control system 152 lowers the workload for an operator of the pilot interface and also increases the operator's awareness of the propeller's position. As a result of this awareness, the operator may respond more efficiently and with improved handling qualities to unforeseen or hazardous conditions.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A pitch control system configured to vary a pitch angle of a plurality of propeller blades of a propeller system of an aircraft, comprising:
   a motor having a motor shaft configured to rotate about an axis;
   a rotary switch including a tab protruding generally outwardly, the rotary switch being coupled to the motor shaft and configured to rotate with the motor shaft about the axis; and
   a position sensor configured to monitor a position of the rotary switch via the motor shaft, wherein the pitch angle of the plurality of propeller blades is controlled in response to a signal indicating the position of the rotary switch.

2. The pitch control system according to claim 1, wherein the rotary switch is rotatable between a first position and a second position, and the first position of the rotary switch corresponds to a maximum pitch angle of the propeller blades in a first direction of rotation.

3. The pitch control system according to claim 2, wherein the second position of the rotary switch corresponds to a maximum pitch angle of the propeller blades in a second direction of rotation, the second direction of rotation being opposite the first direction of rotation.

4. The pitch control system according to claim 3, wherein a third, generally central position of the rotary switch corresponds to a zero pitch angle of the propeller blades.

5. The pitch control system according to claim 4, wherein at least a portion of the pitch control system is arranged within a pilot interface.

6. The pitch control system according to claim 5, wherein the pilot interface is one of a collective control and a cyclic control.

7. The pitch control system according to claim 5, wherein the pilot interface further comprises a raised marker configured to align with the tab of the rotary switch when the rotary switch is in a third position.

8. The pitch control system according to claim 1, wherein the position sensor is operably coupled to a flight control computer of a flight control system, the position sensor being configured to provide the position of the rotary switch as an input to the flight control computer.

9. The pitch control system according to claim 8, wherein the flight control computer is configured to activate one or more actuators coupled to the plurality of propeller blades in response to input from the position sensor.

10. The pitch control system according to claim 1, wherein a roughened material is positioned about at least a portion of the tab.

11. A rotary wing aircraft includes a propeller system having a plurality of propeller blades, comprising:
    a first pilot interface having a first pitch control system configured to adjust a pitch angle of the propeller blades of the propeller system, the first pitch control system including:
    a first motor having a first motor shaft configured to rotate about a first axis;
    a first rotary switch including a first tab protruding generally outwardly, the first rotary switch being coupled to the first motor shaft and configured to rotate with the first motor shaft about the first axis; and
    a first position sensor configured to monitor a position of the first rotary switch via the first motor shaft, wherein the pitch angle of the plurality of propeller blades is controlled in response to a signal indicating the position of the first rotary switch;

a second pilot interface having a second pitch control system configured to adjust the pitch angle of the propeller blades of the propeller system;

a second motor having a second motor shaft configured to rotate about a second axis;

a second rotary switch including a second tab protruding generally outwardly, the second rotary switch being coupled to the second motor shaft and configured to rotate with the second motor shaft about the second axis; and a second position sensor configured to monitor a position of the second rotary switch, wherein the pitch angle of the plurality of propeller blades is controlled in response to a signal indicating the position of the second rotary switch; and a flight control system including a flight control computer operably coupled to the first pitch control system and the second pitch control system such that the second rotary switch is rotatable in response to rotation of the first rotary switch such that the first rotary switch and the second rotary switch are in generally identical positions.

12. The rotary wing aircraft according to claim 11, wherein the first rotary switch is configured to rotate in response to rotation of the second rotary switch such that the first rotary switch and the second rotary switch are in generally identical positions.

13. The rotary wing aircraft according to claim 11, wherein the first rotary switch and the second rotary switch are rotatable between a first position and a second position, and the first position of both the first rotary switch and the second rotary switch corresponds to a maximum pitch angle of the propeller blades in a first direction of rotation.

14. The rotary wing aircraft according to claim 13, wherein the second position of both the first rotary switch and the second rotary switch corresponds to a maximum pitch angle of the propeller blades in a second direction of rotation, the second direction of rotation being opposite the first direction of rotation.

15. The rotary wing aircraft according to claim 14, wherein a third, generally central position of both the first rotary switch and the second rotary switch corresponds to a zero pitch angle of the propeller blades.

16. The rotary wing aircraft according to claim 11, wherein the first pilot interface and the second pilot interface are one of a collective control and a cyclic control.

17. The rotary wing aircraft according to claim 11 wherein at least one of the first pilot interface and the second pilot interface further comprises a raised marker configured to align with the first tab or the second tab when the first rotary switch or the second rotary switch is in a third position.

18. A method of adjusting a pitch angle of a plurality of propeller blades of a propeller system of an aircraft comprising:

monitoring a position of a rotary switch using a position sensor;

rotating the rotary switch of a pitch control system to a first position;

transmitting the first position of the rotary switch from the position sensor to a flight control computer;

generating a signal indicative of an amount and direction of rotation for at least one of the plurality of propeller blades to achieve a pitch angle corresponding to the first position of the rotary switch; and rotating at least one of the plurality of propeller blades to the pitch angle.

* * * * *